(12) United States Patent
Sellars et al.

(10) Patent No.: US 6,996,544 B2
(45) Date of Patent: Feb. 7, 2006

(54) MULTIPLE PARTY CONTENT DISTRIBUTION SYSTEM AND METHOD WITH RIGHTS MANAGEMENT FEATURES

(75) Inventors: William Sellars, Milwaukee, WI (US); William K. Cochran, Jr., Champaign, IL (US); David C. Hunt, Washington, DC (US)

(73) Assignee: Imagineer Software, Inc., Milwaukee, WI (US)

( * ) Notice: Subject to any disclaimer, the term of this patent is extended or adjusted under 35 U.S.C. 154(b) by 0 days.

(21) Appl. No.: 10/248,894

(22) Filed: Feb. 27, 2003

(65) Prior Publication Data

US 2003/0187799 A1    Oct. 2, 2003

Related U.S. Application Data

(60) Provisional application No. 60/360,023, filed on Feb. 27, 2002.

(51) Int. Cl.
    *G06T 17/60*      (2006.01)
(52) U.S. Cl. .............................. 705/51; 705/1; 705/50; 380/1; 380/255; 380/268
(58) Field of Classification Search ................. 705/51, 705/1, 50; 380/1, 255, 268
See application file for complete search history.

(56) References Cited

U.S. PATENT DOCUMENTS

| | | | |
|---|---|---|---|
| 4,182,933 A | 1/1980 | Rosenblum | |
| 4,568,914 A | 2/1986 | Gutleber | |
| 4,661,980 A | 4/1987 | Byram | |
| 4,731,840 A | 3/1988 | Mniszewski et al. | |
| 5,351,293 A | 9/1994 | Michener et al. | |
| H1586 H | 9/1996 | Fellows et al. | |
| 5,717,756 A | 2/1998 | Coleman | |
| 5,745,575 A | 4/1998 | Otto et al. | |
| 5,751,805 A * | 5/1998 | Otsuki et al. ................. | 705/54 |
| 5,802,294 A | 9/1998 | Ludwig et al. | |
| 5,847,677 A | 12/1998 | McCorkle | |
| 5,889,860 A | 3/1999 | Eller et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,915,021 A | 6/1999 | Herlin et al. | |
| 5,917,912 A | 6/1999 | Ginter et al. | |
| 5,920,630 A | 7/1999 | Wertheimer et al. | |
| 5,949,876 A | 9/1999 | Ginter et al. | |
| 5,982,891 A | 11/1999 | Ginter et al. | |
| 5,991,399 A | 11/1999 | Graunke et al. | |

(Continued)

FOREIGN PATENT DOCUMENTS

JP      04196848    *   7/1992

OTHER PUBLICATIONS

Authentication Based on Logical Time, Anand Natrajan, May 10, 1996.*

(Continued)

*Primary Examiner*—James P. Trammell
*Assistant Examiner*—John M. Winter
(74) *Attorney, Agent, or Firm*—Michael Best & Friedrich LLP

(57) ABSTRACT

A multiple party system for distributing content. In one embodiment, four parties are involved in the system: a consumer, a service provider, an authenticator, and a content provider. The distribution of content from the content provider to the consumer is carried out using a predefined protocol, mutating IDs, and licenses. The authenticator controls the distribution of mutating IDs and verifies the identity of one or more participating parties.

26 Claims, 13 Drawing Sheets

U.S. PATENT DOCUMENTS

| | | | |
|---|---|---|---|
| 5,999,285 | A | 12/1999 | Brandt et al. |
| 6,002,772 | A | 12/1999 | Saito |
| 6,014,688 | A | 1/2000 | Venkatraman et al. |
| 6,125,185 | A | 9/2000 | Boesch |
| 6,148,404 | A | 11/2000 | Yatsukawa |
| 6,178,505 | B1 | 1/2001 | Schneider et al. |
| 6,189,098 | B1 | 2/2001 | Kaliski, Jr. |
| 6,192,131 | B1 | 2/2001 | Geer, Jr. et al. |
| 6,226,750 | B1 | 5/2001 | Trieger |
| 6,230,269 | B1 | 5/2001 | Spies et al. |
| 6,233,685 | B1 | 5/2001 | Smith et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,304,897 | B1 | 10/2001 | Venkatraman et al. |
| 6,330,670 | B1 | 12/2001 | England et al. |
| 6,363,488 | B1 | 3/2002 | Ginter et al. |
| 6,367,010 | B1 | 4/2002 | Venkatraman et al. |
| 6,382,357 | B1 * | 5/2002 | Morrison et al. ............ 186/61 |
| 6,389,402 | B1 | 5/2002 | Ginter et al. |
| 6,427,140 | B1 | 7/2002 | Ginter et al. |
| 6,477,647 | B1 | 11/2002 | Venkatraman et al. |
| 6,647,417 | B1 | 11/2003 | Hunter et al. |
| 2001/0026618 | A1 | 10/2001 | Van Wie et al. |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0112171 | A1 | 8/2002 | Ginter et al. |
| 2002/0199108 | A1 | 12/2002 | Chuang et al. |
| 2003/0002673 | A1 | 1/2003 | Van Wie et al. |
| 2003/0005010 | A1 | 1/2003 | Cleve et al. |
| 2003/0023651 | A1 | 1/2003 | Whaley et al. |
| 2003/0023856 | A1 | 1/2003 | Horne et al. |
| 2004/0024670 | A1 | 2/2004 | Valenzuela et al. |

OTHER PUBLICATIONS xCP: eXtensible Content Protection, IBM Research Division Almaden Research Center; pp. 1-5; 2003.

Neuman, Clifford; Zorn, Glen; and Hornstein, Ken; Internet Draft—Integrating Single-Use Authentication Mechanisms with Kerberos, Nov. 18, 1998; Updates: RFC 1510; 13 pages; obtained from http://www.globecom.net/ietf/draft/draft-ietf-cat-kerberos-passwords-04.html on Sep. 26, 2003.

H.X. Mel, Doris Baker; Chapter 8, Problems with Secret Key Exchange; Cryptography Decryped, First Printing Dec. 2000; pp. 65-73; Addison-Wesley USA.

Michael A. Caloyannides; Encryption wars: early battles; IEEE Spectrum, Apr. 2000, pp. 37-43, vol. 37, No. 4, IEEE, Inc., New York, NY.

Bruce Schneier, Protocols, Algorithms, and Source Code in C, Applied Cryptography, 1996, pp. 29 and 33, Second Edition, John Wiley & Sons, Inc.

Jim Taylor, Content Protection, DVD Demystified Second Edition, 2001, Chapter 4, pp. 190-204, McGraw-Hill, New York.

Daniel Gottesman and Hoi-Kwong Lo, From Quantum Cheating to Quantum Security, Physics Today Online, Nov. 2000, pp. 1-11, http://www.aip.org/pt/vol-53/iss-11/p22.html, American Institute of Physics.

Steven M. Cherry, Making Music Pay, IEEE Spectrum, Oct. 2110, pps. 41-46.

Paul Wallich, Digital Hubbub, IEEE Spectrum, Jul. 2002, pps. 26-33.

Gina Kolata, The Key Vanishes: Scientist Outlines Unbreakable Code, The New York Times on The Web, Feb. 20, 2001.

* cited by examiner

CONTENT IS ENCRYPTED BY THE CONTENT PROVIDER ONLY ONCE AND DISTRIBUTED TO ALL SERVICE PROVIDERS.

\* IN THE REFERENCE IMPLEMENTATION n AND m ARE BOTH 256

THERE ARE TWO METHODS OF PACKAGING LICENSES. 1) FOR EACH PROVIDER, THE AUTHENTICATOR GENERATES A LIST OF LICENSE PAIRS.

THE LIST MAY BE DISTRIBUTED EITHER BY HAND, PUBLIC KEY ENCRYPTION, OR ENCODING WITH A LICENSE KEY FROM A PREVIOUSLY DISTRIBUTED LIST.

2) FOR EACH CONSUMER, A SINGLE MUTATING ID IS DISTRIBUTED.

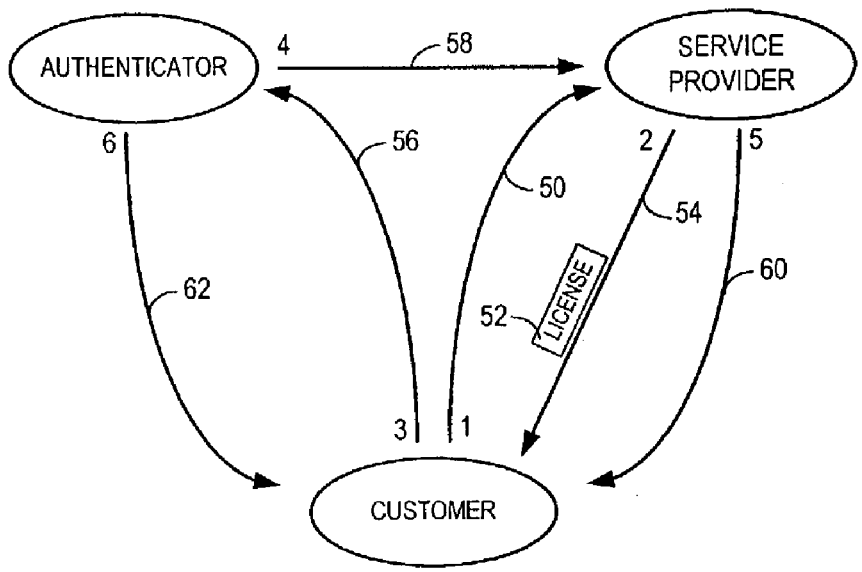

1 CUSTOMER MAKES A REQUEST FROM THE SERVICE PROVIDER TO VIEW SOME CONTENT.

2 THE SERVICE PROVIDER SENDS TO THE CUSTOMER AN ENCRYPTED LICENSE RECEIVED FROM THE CONTENT PROVIDER AND ENCRYPTED BY THE SERVICE PROVIDER.

3 THE CUSTOMER'S SET TOP BOX WILL ENCRYPT THE LICENSE WITH ITS OWN LICENSE AND SENDS IT TO THE AUTHENTICATOR.

4 THE AUTHENTICATOR CHECKS THE LICENSE FOR VALIDITY. IF VALID, THE AUTHENTICATOR TELLS THE SERVICE PROVIDER THAT THE CUSTOMER HAS AGREED TO PAY FOR THE CONTENT.

5 THE CONTENT PROVIDER THEN SENDS THE ENCRYPTED CONTENT TO THE CUSTOMER.

6 SIMULTANEOUSLY, THE AUTHENTICATOR SENDS DECODING INFORMATION.

FIG. 5

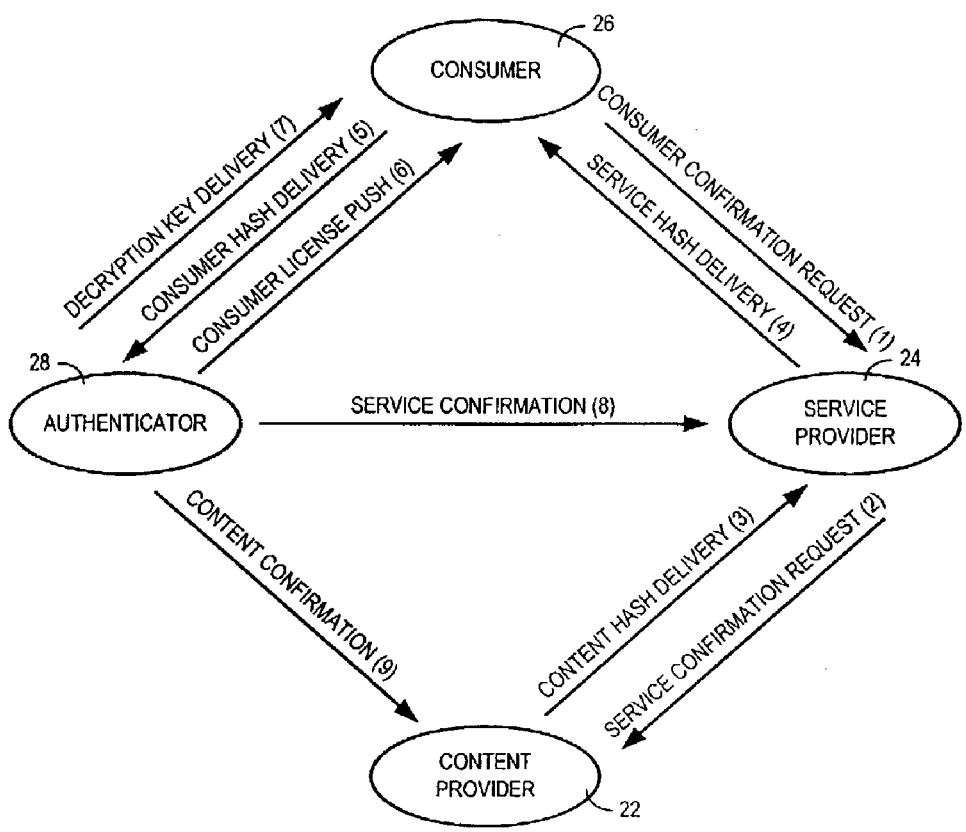

(1) CONSUMER MAKES A REQUEST FOR A MOVIE OR CONTENT.
(2) THE DISTRIBUTOR OR SERVICE PROVIDER RELAYS REQUEST TO THE PRODUCER OR CONTENT PROVIDER.
(3) THE PRODUCER ENCRYPTS A HASH OF THE MOVIE'S TITLE (OR SOME OTHER IDENTIFYING INFORMATION) USING ONE OF THE LICENSES ACQUIRED EARLIER.
SENDS:

| | ── ENCRYPTED BY PRODUCER KEY ── |
|---|---|
| PRODUCER LIC. # | IDENTIFYING INFORMATION FOR MOVIE |

(4) DISTRIBUTOR ENCRYPTS MESSAGE FROM PRODUCER WITH ONE OF ITS LICENSES ACQUIRED EARLIER.
SENDS:

| | | ── ENCRYPTED BY DISTRIBUTOR KEY ── |
|---|---|---|
| | | ── ENCRYPTED BY PRODUCER KEY ── |
| DISTRIBUTOR LIC. # | PRODUCER LIC. # | IDENTIFYING INFORMATION FOR MOVIE |

(5) CONSUMER ENCRYPTS MESSAGE FROM PRODUCER WITH HIS OWN LICENSE.
SENDS:

| | ── ENCRYPTED BY CONSUMER KEY ── | | |
|---|---|---|---|
| | | ── ENCRYPTED BY DISTRIBUTOR KEY ── | |
| | | | ── ENCRYPTED BY PRODUCER KEY ── |
| CONSUMER LIC. # | DISTRIBUTOR LIC. # | PRODUCER LIC. # | IDENTIFYING INFORMATION FOR MOVIE |

(6) NEW LICENSE IS SENT TO CONSUMER BY THE KEY MASTER OR AUTHENTICATOR.
(7) PRODUCER IS INFORMED OF THE USE OF HIS LICENSE IF HE SO DESIRES. ALTERNATIVELY, LICENSE USAGE MAY BE TRACKED BY THE KEY MASTER.
(8) DECRYPTION KEY FOR VIDEO OR CONTENT IS DELIVERED TO THE CONSUMER.
(9) DISTRIBUTOR IS INFORMED OF THE USE OF HIS LICENSE (E.G., FOR BILLING PURPOSES) AND IS TOLD TO BEGIN SENDING ENCRYPTED MOVIE DATA OR CONTENT.

*FIG. 6*

CHIT = IDENTIFYING DATA OR LICENSE

MULTIPLE PARTY CONTENT DISTRIBUTION SYSTEM AND METHOD WITH RIGHTS MANAGEMENT FEATURES

CROSS REFERENCE TO RELATED APPLICATIONS

This application claims the benefit of provisional application No. 60/360,023 filed on Feb. 27, 2002.

BACKGROUND OF INVENTION

The invention relates to the distribution of content (which as used herein broadly encompasses information of all sorts including, but not limited to, messages, text, audio, video, multi-media materials, and the like). More particularly, the invention relates to the distribution of such content in a manner that ensures that the copyrights and other similar legal rights of the content owner are respected.

More and more content is being delivered in digital form, and more and more digital content is being delivered over private and public networks, such as Intranets, the Internet, cable TV networks, and the like. For consumers of such content, digital versions (as opposed to analog, paper copy, and other forms) provide various advantages such as enhanced fidelity, improved and greater playback options, interactivity, and others. Online or network delivery generally offers greater convenience and timeliness. Online delivery is also cheaper than other delivery methods, and this benefits content publishers.

Most current and potential digitally distributed content is, like most books, distributed in a manner such that the publisher or owner generally gives or sells the content to a consumer, but continues to restrict rights to use the content even after the content is under the sole physical control of the consumer. For instance, a content owner typically retains copyright to the content so that the consumer cannot legally reproduce or publish the work without permission. Digital content, as opposed to older forms of media, allows a content owner to adjust pricing according to whether the consumer is allowed to make a persistent copy, or is just allowed to view the content as it is delivered.

Despite the worthwhile attributes of digital and network distribution, content owners are still generally reluctant to distribute content, particularly high-value content, via networks because unauthorized duplication, piracy, and distribution of digital content (e.g., as was done by users of Napster) is very easy. Unlike analog recorders, photocopiers, and other older devices, current technology permits unlimited, pristine copies of digital content to be made. And, in most instances, copies of the digital content can be made very quickly or nearly instantaneously. Furthermore, even current protective measures such as public key encryption and the content scrambling system (CSS), which is used for digital versatile discs, have been defeated.

SUMMARY OF INVENTION

In light of the above, there is a need to provide a method and system of distributing content that ensures that the rights of content owners are respected.

The present invention provides among other things a multiple party system for distributing content. In one embodiment, four parties are involved in the system: a consumer, a service provider, an authenticator, and a content provider. The distribution of content from the content provider to the consumer is carried out using a predefined protocol, mutating IDs, and licenses. The authenticator controls the distribution of mutating IDs and verifies the identity of one or more parties.

The invention also provides a method for distributing content. In one embodiment, the method includes having a consumer make a request for content to a service provider and relaying the request to a content provider. In response to the request, the content provider creates a license that includes identifying information concerning the service provider and encrypted information identifying the requested content. The license is sent to the service provider. The service provider encrypts the license from the content provider with one of its own licenses and sends this message to the consumer. The consumer encrypts the message to create an authentication request and sends the authentication request to an authenticator. The authenticator checks the authentication request and, if valid, informs the content provider to send encrypted content to the consumer. A decryption key is sent by the authenticator to the consumer so that the consumer may decrypt and view the content.

In another embodiment, the invention provides a content distribution system that includes an authenticator and a content provider. The content provider has content and a content identifier, and generates a first mutating identifier associated with the content identifier. The system also includes a consumer device that is operable to generate a request for the content. In addition, the system includes a service provider. The service provider receives the request from the consumer device, receives the first mutating identifier from the content provider, generates a second mutating identifier associated with the first mutating identifier, and distributes the second mutating identifier to the consumer device. The consumer device generates a third mutating identifier associated with the second mutating identifier, and distributes the third mutating identifier to the authenticator. The authenticator validates the request and thereafter informs the service provider of the validity of the request. If the request is valid, the content provider thereafter encrypts the content and sends the encrypted content to the consumer while the authenticator sends a decryption code to the consumer.

As is apparent from the above, it is an advantage of the present invention to provide a method and system of distributing content. Other features and advantages of the present invention will become apparent by consideration of the detailed description and accompanying drawings.

BRIEF DESCRIPTION OF DRAWINGS

In the drawings:

FIG. 5 is a schematic illustration of another portion of the system shown in FIG. 1.

FIG. 6 is a schematic illustration of a communication protocol used in the system shown in FIG. 1.

DETAILED DESCRIPTION

Figure 1:
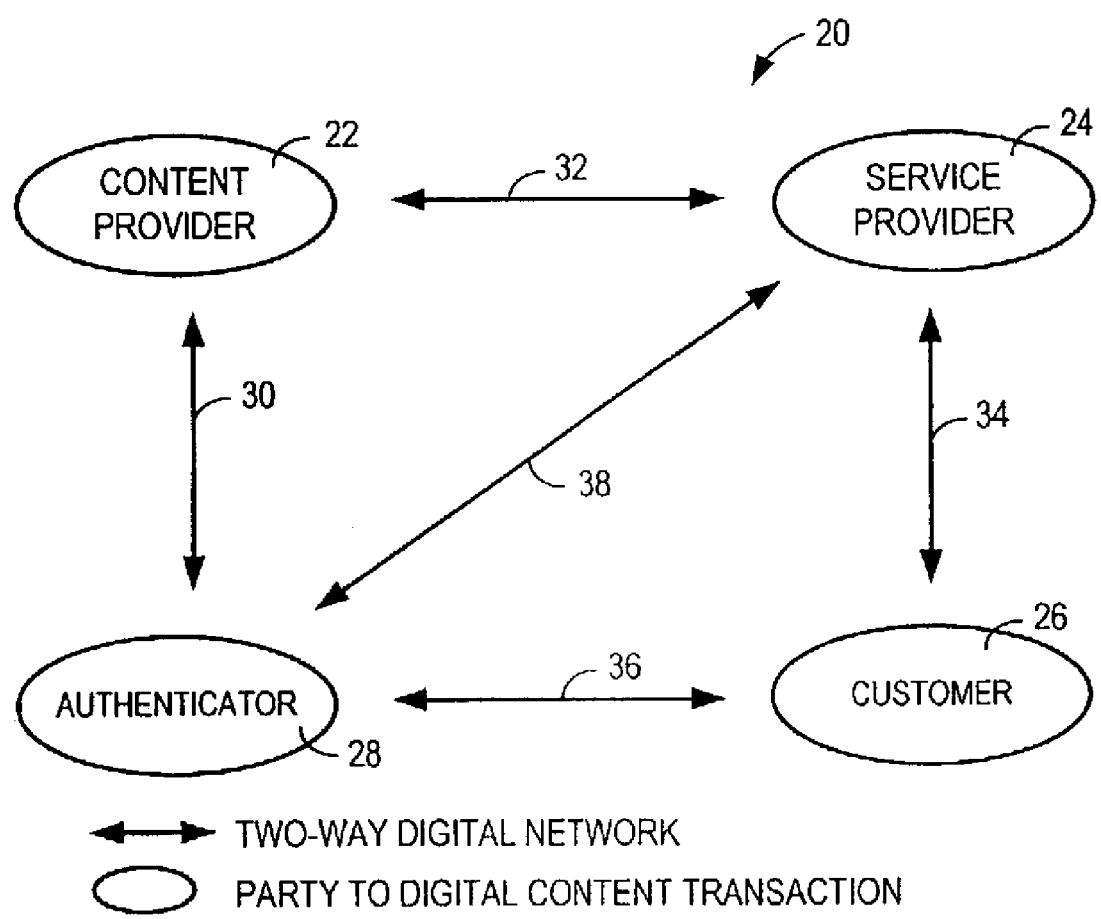
FIG. 1 is a schematic illustration of a system of one exemplary embodiment of the invention.

Before embodiments of the invention are explained in detail, it is to be understood that the invention is not limited in its application to the details of the construction and the arrangements of the components set forth in the following description or illustrated in the drawings. The invention is capable of still other embodiments and of being practiced or being carried out in various ways. Also, it is to be understood that the phraseology and terminology used herein is for the purpose of description and should not be regarded as limiting.

FIG. 1 illustrates an exemplary system 20 configured to distribute content over a network. In reality, one or more networks or communication systems such as the Internet, the telephone system, wireless networks, satellite networks, cable TV networks, and various other private and public networks could be used in various combinations to provide the communication links desired or needed to create embodiments or implementations of the invention, as would be apparent to one of ordinary skill in the art. Thus, the invention is not limited to any specific network or combinations of networks. However, it is preferred that the networks or communication system used have the ability to support secure communications such as communications with data encrypted with a version of Rijndael encryption, secured socket layer ("SSL") communications, or others. Furthermore, data can be transferred from one party to another with wire, digital satellite service ("DSS"), or physical media being physically carried from one party to another.

In the embodiment shown, the system 20 includes four participants: a content owner or provider 22, a service provider 24, such as a cable company, Internet service provider, or the like, a consumer 26, and an authenticator 28. Although, only one content provider, service provider, and customer are shown, in most implementations of the invention numerous content providers, service providers, and customers will be involved. Further, there could even be multiple authenticators, although only one is required. In practice, it is likely that the following relationship will exist: no. of authenticators<number of content providers<no. of service providers<no. of customers, but again there is no limit on the number of participants or any requirement of a particular relationship between the numbers of the various types of participants.

The participants 22, 24, 26, and 28 are connected to each other via two-way links 30, 32, 34, 36, and 38. These links may be a constructed from all or part of the networks mentioned above. The system 20 uses a key-based encryption algorithm and currently available algorithms such as the Rijndael algorithm may be used. The ultimate choice for the algorithms used will depend on a variety of factors including a trade off between the strength of the algorithm (in terms of being broken) and speed (in terms of a processor's capability to perform the mathematical operations required by the chosen algorithm).

In one embodiment of the invention, it is assumed that the customer has a decoding processor or similar device, which may, for example, take the form of a set top box, home computer, or other device. In this same embodiment, it is assumed that the decoding processor is in a hostile environment, in the sense that customer may possibly want to tamper or otherwise circumvent rights management features of the decoding processor. Thus, it is preferred that the decoding processor be housed in a container that has the ability to detect intrusions to its interior. It is also preferable, that the decoding processor have persistent memory such as non-volatile RAM, EPROM, or other storage where data remains intact after the removal of power. The persistent memory is used to store identification information, which may be a mutating ID that changes over time.

In preferred embodiments, the system 20 uses a random number generator to generate certain numbers used by a protocol implemented or followed by the system. It is preferred that the random number generator produce numbers that are as truly random as is possible with the particular technology used to implement the invention. In one embodiment, communication traffic, such as requests from customers to obtain content, is used to create random numbers. Such requests occur, in general, in an unpredictable manner. Thus, the random numbers generated based on such traffic are also truly or nearly truly random, as opposed to pseudo random numbers generated with algorithmic methods.

In the exemplary embodiment shown, each of the parties 22–28 in the system 20 has different responsibilities and it is assumed that each party trusts the authenticator 28. Further, it is preferable that content provider 22, service provider 24, and consumer 26 be assigned a changing or mutating identifier (ID), which is explained further below.

Content Provider

The content provider 22 is an entity such as a movie studio, recording company, or any other entity that wishes to distribute content electronically. In general, it is assumed that the content provider 22 owns the copyright or other intellectual property rights in the content or is authorized by the owner of such rights to distribute the content. It is assumed that the content provider 22 wants to be reimbursed fairly for each copy of its content distributed using the system 20. Thus, in one preferred embodiment of the invention, the system 20 is configured such that the content provider 22 can produce a virtual inventory of its content (i.e., a list of mutating IDs (generally created as needed)), where each mutating ID represents a license to view or in some cases maintain a copy of the content provided. The virtual inventory (or set of licenses) may be assigned to various distribution entities, such as one or more service providers. As the virtual inventory is consumed, the consumption is tracked in order to record, log, or note which service provider 24 provided the content to one of the consumers. For instance, tracking of the virtual memory allows a content provider such as a movie studio, which has sold distribution rights to a cable company and a satellite broadcasting company, to determine which of the entities, the cable company or the satellite broadcasting company, distributed the content to the subject consumer. The tracking system also allows the consumption activity of individual consumers to be recorded or logged. In preferred embodiments, the content provider 22 is the sole encrypter of its content and controls the decoding of the content by, for example, denying a request, as explained further below.

Service Provider

In the embodiment shown, the service provider 24 distributes content of the content providers. However, service providers may also have several additional responsibilities, including identification of themselves and the subject content with mutating IDs. In the embodiments described, a user such as the consumer 26 without the appropriate mutating IDs cannot decode content. In many scenarios, the service provider 24 provides the requested content off of or from a storage device that is local to the service provider 24. However, the invention is not limited to any particular location of the content and content may be retrieved from storage of the content provider 22 and then transferred to the consumer 26. In preferred embodiments of the invention, every service provider 24 sees each request from consumers in the system 20 and receives authentication from the authenticator 28. In some embodiments, any one of the service providers in a particular embodiment may be responsible for shipping or transferring the content to the consumer. This allows content providers to avoid having to deliver their content to service providers, if they so desire. In other words, the service provider 24 need not possess (such as by maintaining encrypted copies in local storage) the content that is ordered by consumers.

Consumer

It is assumed that at least some consumers may wish or attempt to view content without paying for it. Therefore, measures are provided to prevent unauthorized viewing of content. The mutating IDs mentioned above provide one mechanism by which content decoding and, therefore, viewing is controlled. By encapsulating multiple mutating IDs, the set top box is able to prove to the authenticator 28 that 1) the set top box is a licensed decoder of the content, 2) the service provider 24 is a licensed distributor of the content, and 3) the content itself was licensed for use by the content provider 22 for the consumer, as will be explained in greater detail.

Authenticator

Figure 2:
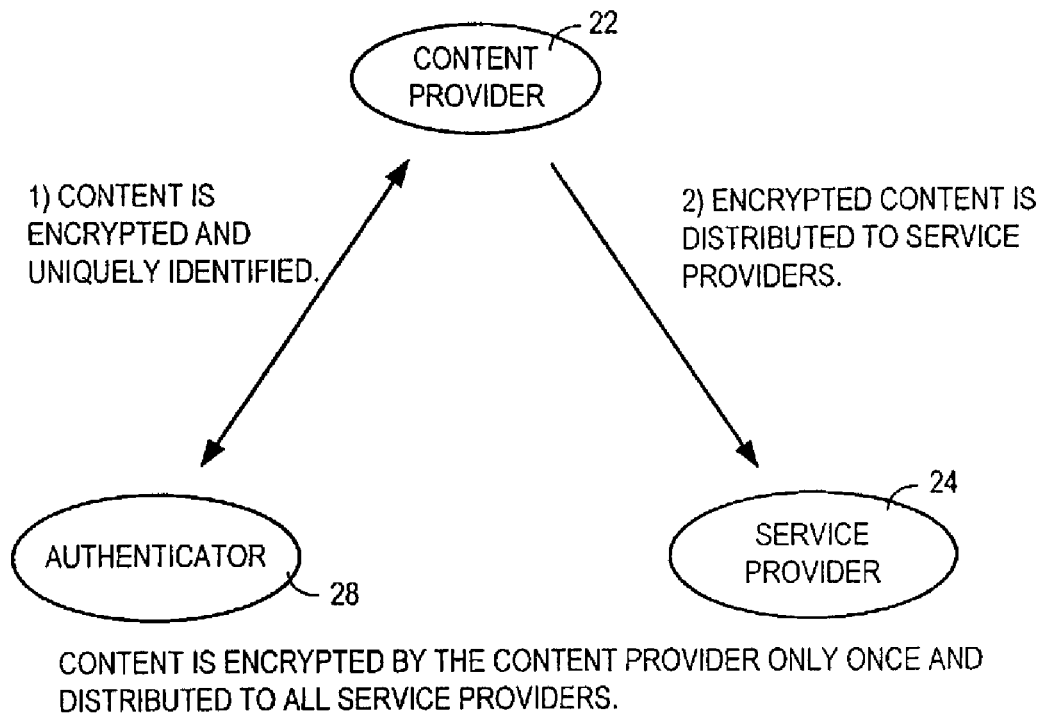
FIG. 2 is a schematic illustration of a portion of the system shown in FIG. 1.

FIG. 2 illustrates an embodiment of the invention where the authenticator 28 supplies mutating IDs 38 to the content provider 22 and the content provider provides encrypted content to the service provider 24. However, in this embodiment, the same piece of content is encrypted once (using the same mutating ID) and sent to multiple content providers rather than using a different mutating ID for each request of content from a consumer and for each content provider.

The authenticator 28 is the repository that holds the data necessary to decode a particular piece of content. In the embodiments discussed, the authenticator 28 verifies the consumer 26, the service provider 24, and the content by their mutating IDs before sending any decoding information to the subject consumer 26. The authenticator 28 is also the source of mutating IDs and keeps track of such IDs using a database or similar mechanism.

Mutating ID

Figure 3A:
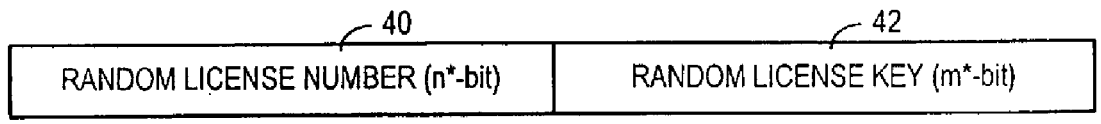
FIG. 3a is an illustration of a bit stream (called a mutating ID or license) used in one embodiment of the invention.
Figure 3B:
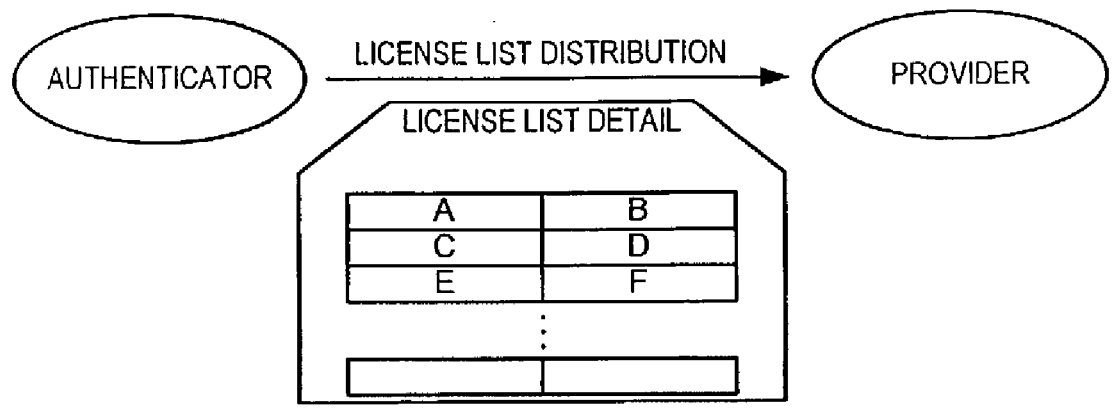
FIGS. 3b and 3c are illustrations of ways to distribute mutating IDs.
Figure 3C:
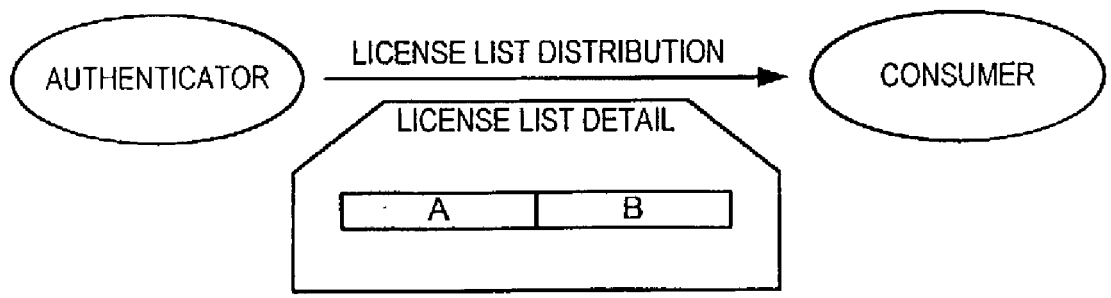

An exemplary mutating ID 38 (sometimes referred to as a"license") is shown in FIG. 3a. The mutating ID 38 is an identifier having two portions: a first portion 40 and a second portion 42. The first portion 40 is an identifying number, which is a random number. The second portion 42 is an encoding/decoding key, also a random number and preferably a symmetric cipher key. As implemented in the embodiments discussed herein, a mutating ID can be used only once and then can not be used again. Mutating IDs are generated and tracked by the authenticator 28. Because the mutating IDs are one-time-use mechanisms, once a service provider or consumer or other entity has used its supply of mutating IDs, additional mutating IDs must be obtained from the authenticator 28. The data in a mutating ID is chosen at random with an equal probability of all possible mutating IDs. While it is preferred that the mutating ID parts be random, the parts are generated such that they cannot be derived from each other by any means. When a collision occurs in the ID parts, a new one is reassigned. As a result, part of the ID is completely random while the other part is less random. Once a request or decode for specific content has been made, the three mutating IDs (consumer, service provider, content) are discarded and new mutating IDs are generated for additional transactions, in a manner described in more detail below. Information regarding how mutating IDs are distributed to parties in the system 20 is also provided in FIG. 3b and 3c.

Protocol

The system 20 uses a protocol to govern communications between entities. Each entity is randomly assigned a one-time-use identifier (such as the identifier or ID 38 shown in FIG. 3A) that is to be tagged onto a previously mutated identifier by the authenticator 28. As noted, each identifier includes a random license number 40 and a random corresponding coding key 42. The one-time-use identifier takes the form of a modified hash. In addition to being random, the one-time-use identifier or the hash is immediately discarded after each decryption. In other words, the protocol generates a new random number that has never been used when a hash or a one-time-use identifier is needed. In addition to identifying the content to be distributed, the one-time-use identifier is also a completely unrelated hash from the content being encrypted. That is, the hash does not contain any information of the content including the identity of the entity. In this way, the identities of the entities are blind to all participants except for the authenticator 28.

After the authenticator 28 randomly assigns an identifier to the content, the content provider will then catalog the virtual inventory for distribution. The random identifier provides a non-deterministic or a random component to the encryption of the identifier. Since there is non-deterministic information in the identifier, there can be no decoding information gained by knowing the decoding key. By identifying everything encoded or all items of information and content with one of the decoding keys generated by the authenticator 28, the authenticator 28 can identify who asked for them, when they asked for the item or items, and for what purpose they asked for them.

There are four pieces of information to be distributed by the authenticator 28. The first is the requested content or the content to be distributed. The second and third are a decode license to be used by the consumer 26 once the license is authenticated, and a distribution license for distributing the encrypted content to the consumer 26. The last is a consumer identifier. To decrypt the content, the decryption takes place in reverse order to the path of distribution. By encapsulating or stacking one item inside another or tagging one to another, the encrypted data is secured. Even if it were possible to obtain the encrypted data, it is considered infeasible to break since the encryption used is at least as strong as Rijndael.

As a result, the preferred embodiments of the system 20 are implemented with an encryption algorithm and a random number generator. Preferably, the encryption algorithm is a symmetric key-based encryption algorithm. The keys are permutation identifications, offsets, and skips. All three could be bundled into one object called a key. Therefore, any key based encryption algorithm can be used in embodiments of the invention. Since introducing a new encryption algorithm can be a very time consuming process, the system 20 was created to allow already existing and tested key-based encryption algorithms to be used.

With respect to generating a random number, in the embodiment shown, three different procedures are used. Of course, other combinations of random number procedures can also be used to generate a random number. The first random number generation procedure is a standard congruential random number. The second random number generation procedure generates a random number that is used to determine a sampling rate of a random stream.

Acquiring a random stream is a difficult part of the entire random number generation process. By conventional definition, a random stream or a set of numbers is considered random if and only if the set is the most compact way to represent the numbers. For instance, given the set 2, 4, 6, 8, 10, . . . , a more compact representation would be $\{2 \text{ili}_i \in Z \in +\}$ or any even number in the positive integer number set. Another way to state this is a set of numbers for which there is no discernable pattern. The goal of encrypted communication is to remove all patterns from the encrypted data being transmitted so that intelligent guessing cannot be used to decrypt the encrypted transmitted data. In embodiments of the system 20, the authenticator 28 provides all the random numbers used in the distribution and transmission of content. As discussed in more detail, the sequence of generated numbers is a sequence of random numbers or a random stream, or at least a close approximation to a random stream.

The third process of the random number generator is to ensure that there is no deterministic way to retrieve the next number. The random streams coming into and leaving the authenticator 28 are encrypted and thereby contain encrypted data. This non-deterministic mechanism used to generate the random stream helps ensure that the random number sequence cannot be represented by a more compact expression, hence defining a random stream.

For example, the authenticator 28 is designed to receive requests to decode various content. These requests will reach the authenticator 28 in a random order. For instance, suppose customer X requests the keys to movie Y, and customer W requests the keys to song Z, etc. These requests are formalized by the protocol as sequences of numbers that have been arbitrarily chosen either to be intentionally arbitrary or encrypted by an arbitrary key. Since the requests are arbitrary in nature and are processed in an arbitrary fashion, a stream of random numbers is naturally generated. By sampling this stream in a semi-arbitrary way (i.e., congruential random number), a very good sequence of random numbers is generated.

In one embodiment, the protocol used in the system 20 combines a packet assembly disassembly generator or PAD, key pairing, and a RC4 random stream cipher. More specifically, to encrypt the information in a window of data, a PAD series is generated once a PAD generator is chosen. A second random stream P is generated based on the PAD series in the following manner:

$$p_k = \text{pad}_{(k_j) \bmod n} \times \text{pad}_{(k_{i+j}) \bmod n} \times \ldots \times \text{pad}_{(k_{i+j}) \bmod n}$$

where $p_k$ is the k-th element of the P series, and $\text{pad}_{(kj) \bmod n}$ is the j-th element of the PAD series. That is, every element of the P series is a combination of exclusive-ORing of the elements in the series generated by the PAD generator. The key pair generally includes a public key and private key. These keys do not have any mathematical relation. They are generated randomly and independently of each other. The keys themselves are simply twenty or more digit numbers. Each entity has a unique key pair.

An exemplary embodiment of the protocol will now be discussed in greater detail. In the embodiment shown in FIG. 1, the content provider 22 performs encryption (and is sometimes referred to as the "encrypter"). The content provider 22 encrypts content with a particular key or set of keys K. The content provider 22 may store or keep the set of keys K or, alternatively, the authenticator 28 may maintain the set of keys. If so maintained, the authenticator 28 maintains the set of keys K in secret. The content of the content provider is assigned a secret identifying label (e.g., a number that, in general, never changes). The label is given to the authenticator 28 and the authenticator associates the label with the keys needed to decode the encrypted content. The association is indirect, as the association process does not provide any entity access to the actual keys. The encrypted content can now be given to the service provider 24 or another entity without fear of unauthorized decoding, because only the content provider and the authenticator have the actual keys needed to decrypt the content. At this point, the content provider 22 creates the virtual inventory for the content. This involves asking the authenticator 28 for as many mutating IDs as the content provider 22 needs or wants to have. Each mutating ID represents a license allowing exactly one use or consumption of the content. As mentioned earlier, the mutating ID is a number and a key. The content provider 22 encrypts the identifying label with the mutating ID key and groups the mutating ID number and encrypted identifying label into a single piece of data called the "encrypted identifier," which is represented here as "$E_{content}$."

As each piece of content is consumed, the authenticator 28 tracks which service provider 24 the particular content came from and notifies the content provider 22 of each such decoding. Once it receives content, the service provider 24 combines each encrypted piece of content with other identifying data before distribution to the consumer 26. Each service provider 24 keeps a collection of mutating IDs on hand that are used to identify that particular service provider. As with all others, these mutating IDs are created and tracked by the authenticator 28. The service provider 24 also has a list of $E_{content}$ identifiers for each piece of content. Once requested, the service provider 24 picks an unused $E_{content}$ identifier and one of its unused mutating IDs. The service provider encrypts the $E_{content}$ identifier with the key of the chosen mutating ID and attaches the associated number creating a piece of data referred to herein as the "distributable content" or "$E_{distrib}$." The service provider 24 sends the $E_{distrib}$ content to the consumer 26 and awaits a confirmation signal from the authenticator 28 that allows decoding.

The confirmation signal is received as an encrypted parcel of data that can be decrypted with the mutating ID key used to create the $E_{distrib}$ content. The confirmation signal is an agreed on, secret set of bytes set by the service provider 24 and authenticator 28. Once the confirmation has been received and verified, the service provider 24 can send the encrypted content or $E_{content}$ identifier to the consumer 26.

As noted above, it is assumed that the consumer 26 wants to cheat the system 20. For that reason, all communications between the consumer 26 and the authenticator 28 are encrypted by some encrypted communication method. The consumer 26 is given only one mutating ID at a time. When the consumer 26 wants to view or receive some content, the consumer 26 makes a selection of the desired content using the set top box or hardware in place at the site of the consumer 26. The hardware device then requests the content from the service provider 24 who sends the $E_{distrib}$ content for a particular decode. Once this has been received by the consumer 26, the $E_{distrib}$ content is encrypted with the consumer's mutating ID key and coupled with the mutating ID number into a consumer identifier referred to as an $E_{consumer}$ identifier. The $E_{consumer}$ identifier is then sent to the authenticator 28 for verification. Upon verification, the authenticator 28 informs the service provider 24 by a secure channel that the consumer's set top box is licensed to consume the subject content. The authenticator 28 also discards the current set top box mutating ID and sends the set top box a new, unused mutating ID.

The consumer 26 simultaneously receives, from separate sources, the encrypted data and keys necessary to decrypt the data. With this, the decoding device can decode the requested content.

Generation of mutating IDs and keeping track of them is the primary task of the authenticator 28. Distribution of mutating IDs to content providers and service providers can be handled via any acceptable means to both, as long as they stay secret to the respective receiver. To ensure that consumers do not ever have more than one mutating ID, once an $E_{consumer}$ identifier is verified as accurate, a new mutating ID is encrypted using the consumer's current mutating ID key and sent to the consumer 26. The consumer can then use that ID for the next transaction. Since the authenticator 28 keeps track of all mutating IDs, it can verify that an $E_{consumer}$ identifier is or contains a valid request. To do so, it finds the key associated with the number in the $E_{consumer}$ identifier and decrypt it, revealing the $E_{consumer}$ identifier. If no key can be found, then the authenticator 28 returns a failure. Using the exact same process, the authenticator 28 recovers the $E_{content}$ identifier. If no key can be found, then the authenticator 28 returns a failure. Once again, the authenticator 28 decrypts the $E_{content}$ identifier, if possible. If it is possible, the authenticator 28 look ups the confirmation code for the service provider 24, encrypts it with the mutating ID key used by the service provider 24, and returns it to the service provider. A new mutating ID is then sent, followed by the decoding data. The authenticator 28 then notes or otherwise records all the participating parties, time, and content involved in the transaction for billing purposes.

As was noted above, one aspect of the invention is to ensure that copies of content are not obtained by unauthorized or unlicensed entities. In the embodiments discussed, obtaining an unauthorized copy of the content would require a person or entity to intercept a message and then break the encrypted content. It is assumed that this is impossible, at least in practical terms, because even if the content was intercepted (which would not be a trivial task) decoding it would be very difficult. This is so, in part, because it is possible, using the random numbers and encryption algorithm discussed to create encrypted data that would require a very long time (on the order of years and in the inventor's opinion, may thousands of years) to decrypt. Types of attack would generally require correctly guessing or otherwise obtaining an $E_{consumer}$ identifier. However, since each mutating ID is used only once by the controller of that ID, there is no way to divine one $E_{consumer}$ identifier by inspecting another. Further, since the mutating IDs are calculated to be random (to the limit of the random number generator), it is infeasible to calculate one mutating ID from another.

In addition to providing a high degree of security, the protocol allows for interchangeable parties at each position. In other words, multiple content providers can use multiple service providers to reach multiple consumers using the authenticator 28 agreed upon by all parties. Further, positions can easily be merged or modified to fit many different distribution models. However, it is generally required that the virtual inventory be maintained by the content provider 22 and/or service provider. As noted, the virtual inventory is preferably a list including secret mutating IDs. The virtual inventory may be traded like any other commodity. Thus, rather than a discrete piece of data being the actual digital content of the desired piece of content, it becomes the $E_{consumer}$ identifier constructed by a particular set of events leading to one particular viewing of that content. Since the $E_{consumer}$ identifier cannot be constructed without cooperation from all parties involved, all parties have the ability to negotiate and reach a mutually beneficial arrangement for the consumption of digital content at the demand of the consumer 26. Should one party decide to not participate, communication with the authenticator 28 can prevent decoding by withdrawing the consent of one or more parties.

As was noted above, the system 20 is not limited to just four parties. More distribution layers can be introduced and verified through the unraveling process in the same manner. For instance, one service provider 24 can distribute to another service provider. The authenticator 28 can continue to unravel an $E_{consumer}$ identifier until it has found a content provider 22. This can be accomplished by the simple recursive algorithm used to create $E_{consumer}$ identifiers. The important distinction is that the implementation of the authenticator 28 controls the ultimate decoding of content based upon the $E_{consumer}$ identifier. Should a content provider 22 or service provider 24 want to control the distribution downstream, it is easy to control by informing the authenticator 28 to deny decoding of content under particular circumstances.

Additional aspects of embodiments of the invention will now be described with respect FIGS. 4–13.

FIG. 5 illustrates the overall process of the consumer 26 requesting content in one embodiment of the invention. First, the consumer 26 makes a request for a particular piece of content (step 50). The request may include an identifier or label associated with the particular piece of content that the consumer found using a search engine or catalog of available content. The label may also be a title of the content such as a movie title or song title. The service provider 24 then requests an encrypted license 52 from the content provider 22 that is associated with the desired content. The service provider sends the license 52 to the customer 26 (step 54). The customer's hardware (e.g., a set top box), encrypts the license 52 with a mutating ID (previously received from the authenticator 28) and sends the now doubly encrypted license 52 to the authenticator 28 (step 56). The authenticator 28 checks the license 52 for validity. If the license is valid, the authenticator 28 so informs the service provider (step 58). The service provider then sends the content to the consumer 26 (step 60). At the same or nearly the same time, the authenticator 28 sends decoding information to the consumer 26 (step 62).

Figure 4:
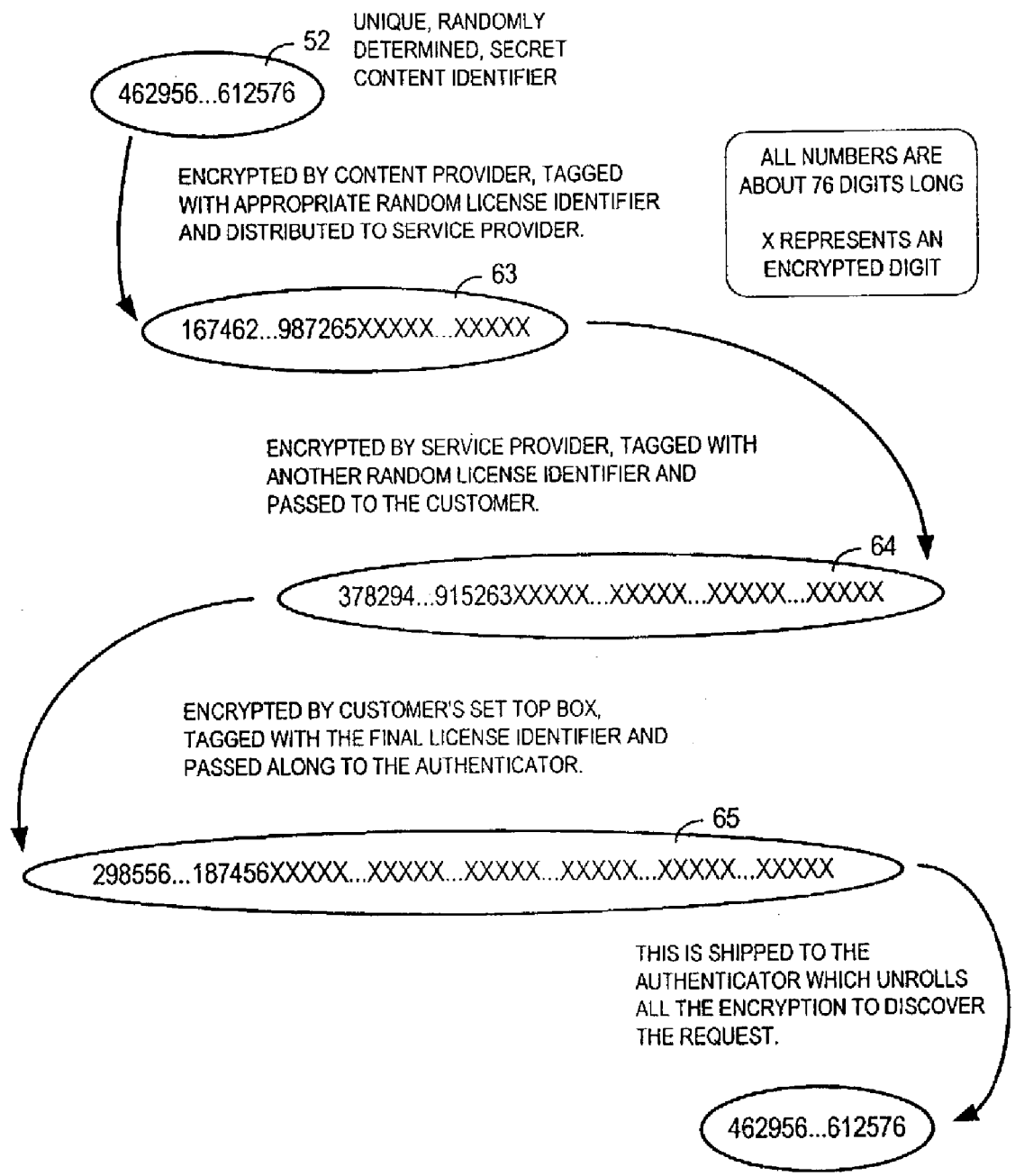
FIG. 4 is a schematic illustration of a license structure for one exemplary embodiment of the invention.

As should be apparent from the discussion above, the license 52 undergoes multiple transformations, in the sense that the license is encrypted multiple times. FIG. 4 illustrates this process. The content provider creates the license 52 upon receiving a request for particular content. The license is an encrypted version of the randomly determined, secret identifier that the content provider created for the subject content. The now once encrypted version of the license (license 63 in FIG. 4) is sent to the service provider 24. The service provider 24 encrypts the license again (license 64 in FIG. 4) and the now doubly encrypted version is sent to the consumer 26. The doubly encrypted license is encrypted with the mutating ID of the consumer to create a thrice-encrypted version (license 65 in FIG. 4). Authentication or verification of the license and ultimately delivery and decoding of information is then performed as noted in the discussion above with respect to FIG. 5. FIG. 6 provides another illustration of the process, including the multiple encryption steps.

Figure 7:
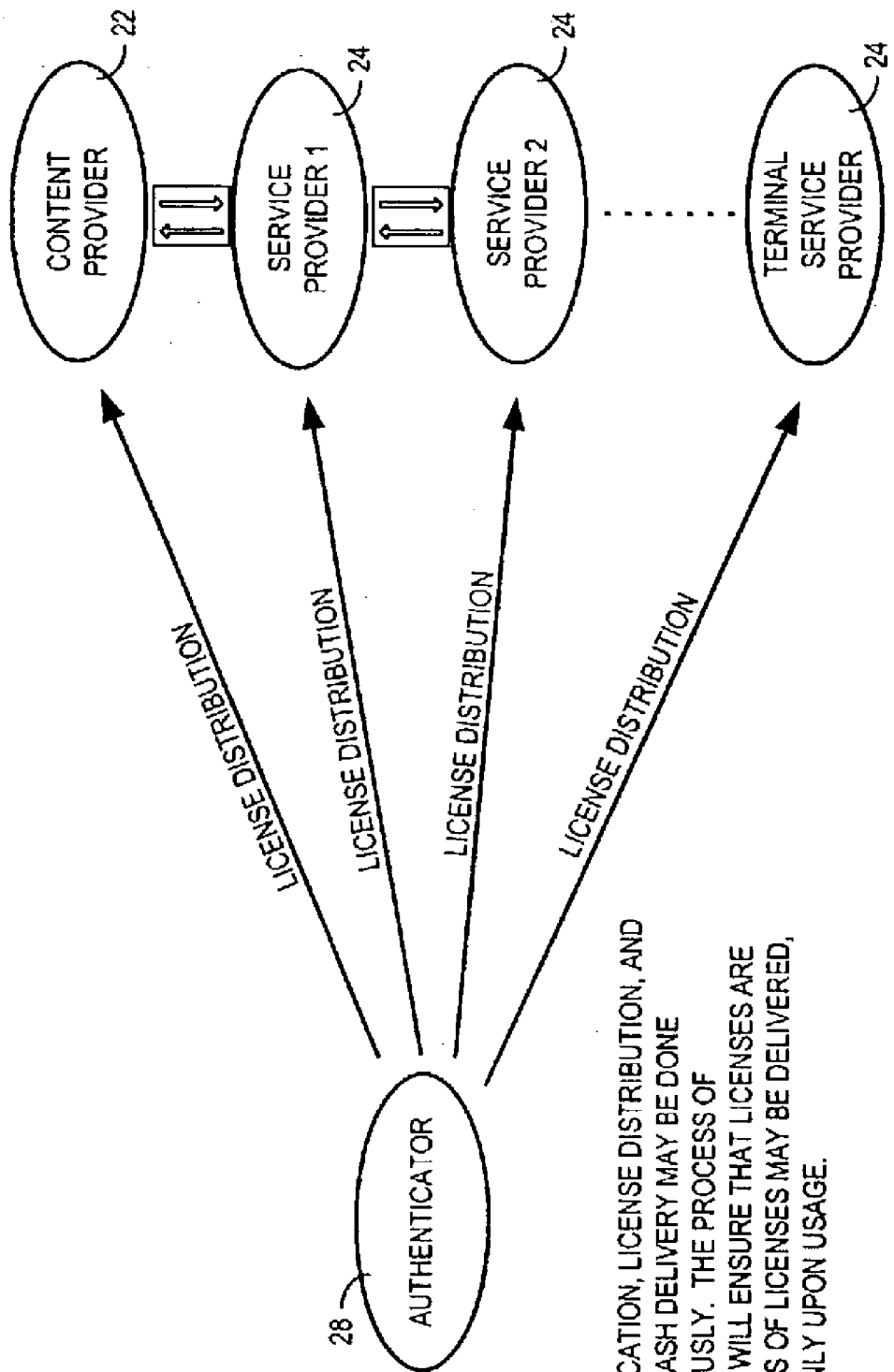
FIG. 7 is a schematic illustration of a portion of the system shown in FIG. 1, illustrating license distribution to multiple service providers.

FIG. 7 illustrates that embodiments of the invention may include multiple service providers. Furthermore, it is envisioned that service providers may have their own content or licenses to particular content that other service providers may desire. Thus, various requests for and transfers of licenses (as shown) may occur between service providers in order to make a large variety of content available to the ultimate consumers of the various service providers participating in the system 20.

Figure 8:
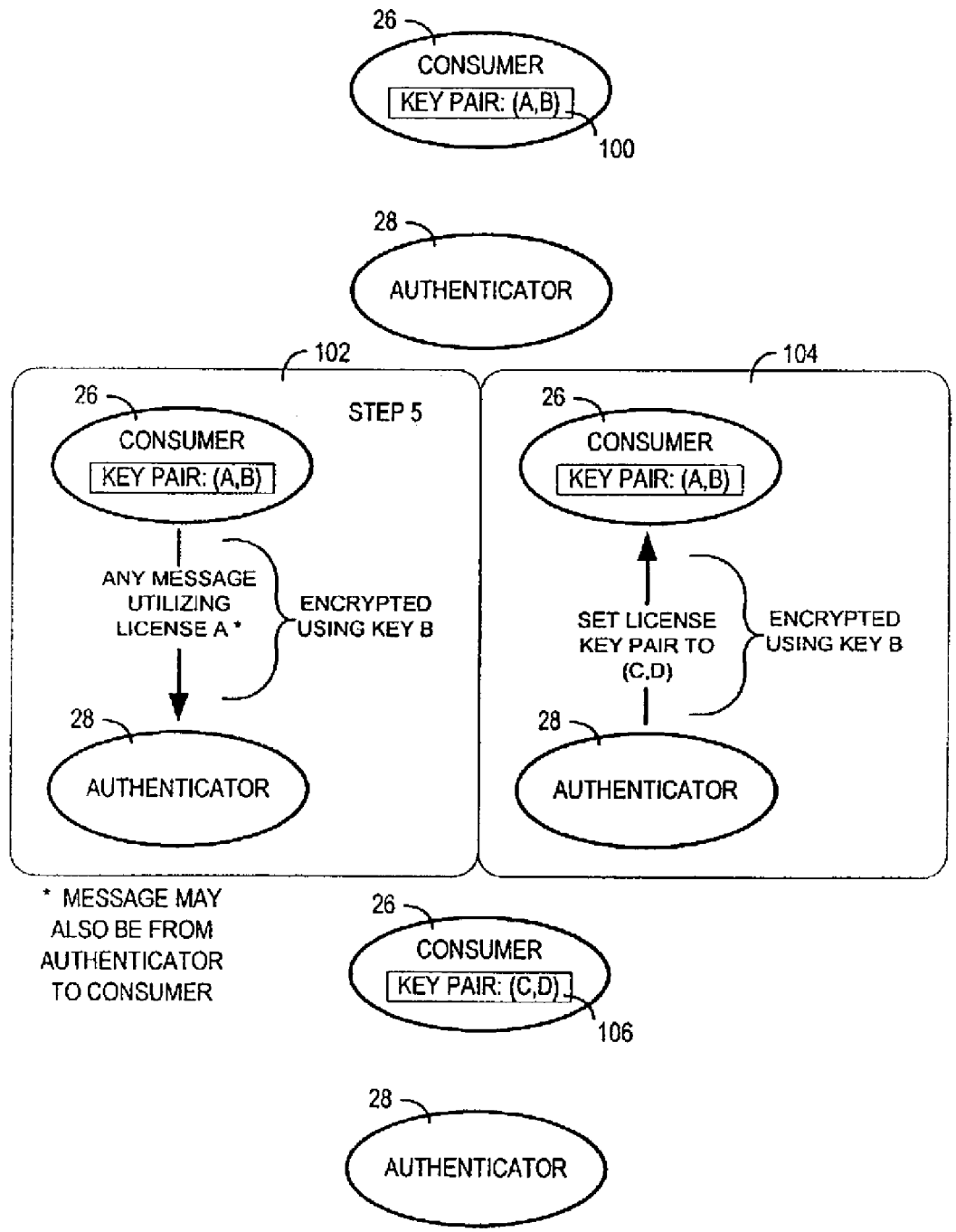
FIG. 8 is a schematic illustration of a mutating identifier cycle used in one form of the invention.

FIG. 8 illustrates how mutating IDs are implemented in one embodiment of the invention. As shown, the consumer 26 is assigned a first mutating ID 100. The consumer uses that mutating ID to confirm its identity (as shown in box 102, which corresponds to step 56 in FIG. 5). However, once the license 100 is used, the authenticator modifies the license 100 or, in other words, sends a new key pair to the consumer, as shown in box 104. The new key pair, in effect, creates a new mutating ID 106.

Figure 9A:
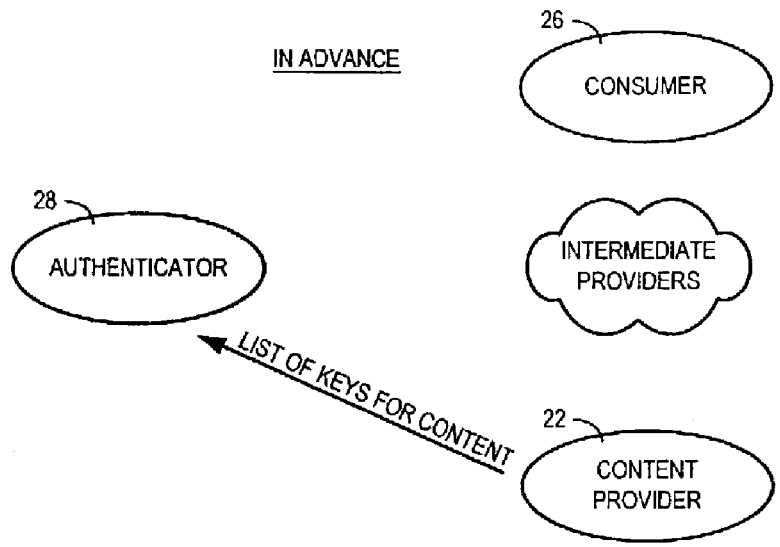
FIG. 9*a* is an exemplary schematic illustration of content key management in one embodiment of the invention.
Figure 9B:
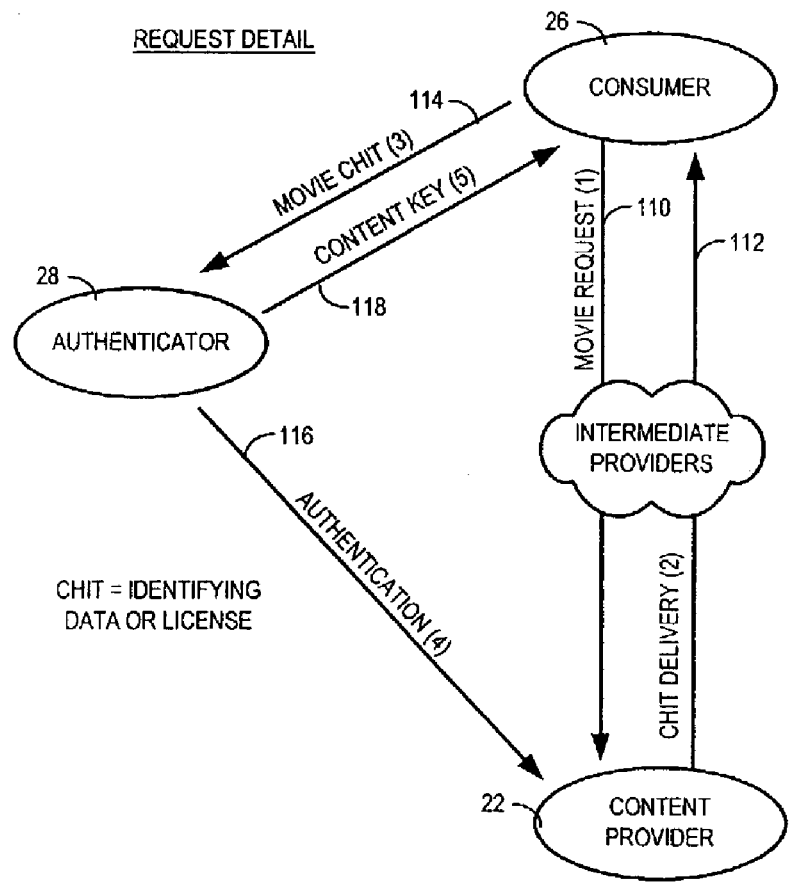
FIG. 9*b* is an exemplary schematic illustration of data flows that occur when content is requested under the situation illustrated in FIG. 9*a*.

FIGS. 9a and 9b illustrate one way on managing content keys. If desired, the system 20 may be set up or configured such that the content provider 22 provides a list of content keys to the authenticator 28. If the system 20 is implemented in this fashion, a request made by the consumer 26 for content is transferred (through one or more intermediary service providers and/or other content providers) to the content provider 22 (step 110 in FIG. 9b). The content provider then sends a license to the consumer 26 (again, through one or more intermediary service providers) (step 112). The consumer 26 then sends its content license to the authenticator for verification or authentication (step 114). If verified, verification information is sent to the content provider 22 (step 116). The authenticator 28 then sends the content key to the consumer 26, so that the content can be decoded and viewed (step 118).

Figure 10A:
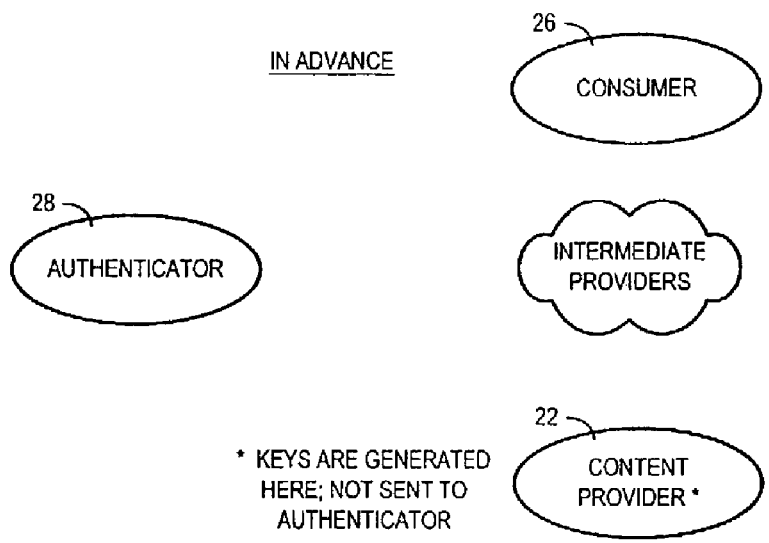
FIG. 10*a* is an exemplary schematic illustration of content key management in another embodiment of the invention.
Figure 10B:
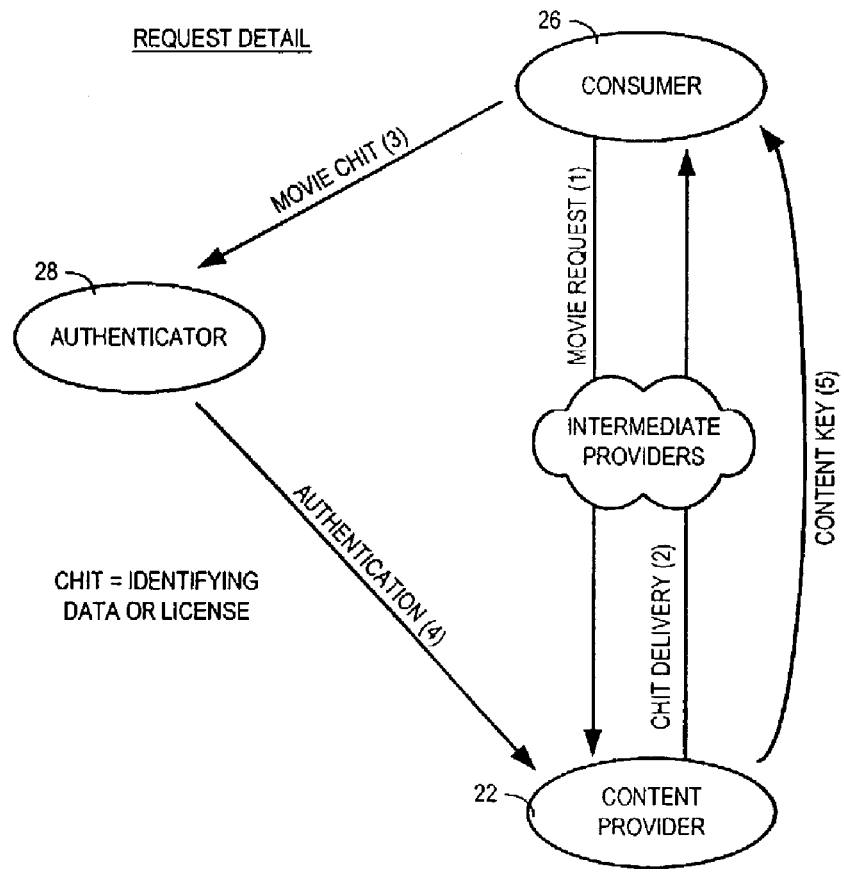
FIG. 10*b* is an exemplary schematic illustration of data flows that occur when content is requested under the situation illustrated in FIG. 10*a*.

FIGS. 10a and 10b illustrate another way of managing keys. The overall process is similar to what was described above with respect to FIGS. 9a and 9b, except that no keys are sent to the authenticator 28, but maintained with the content provider 22.

Figure 11:
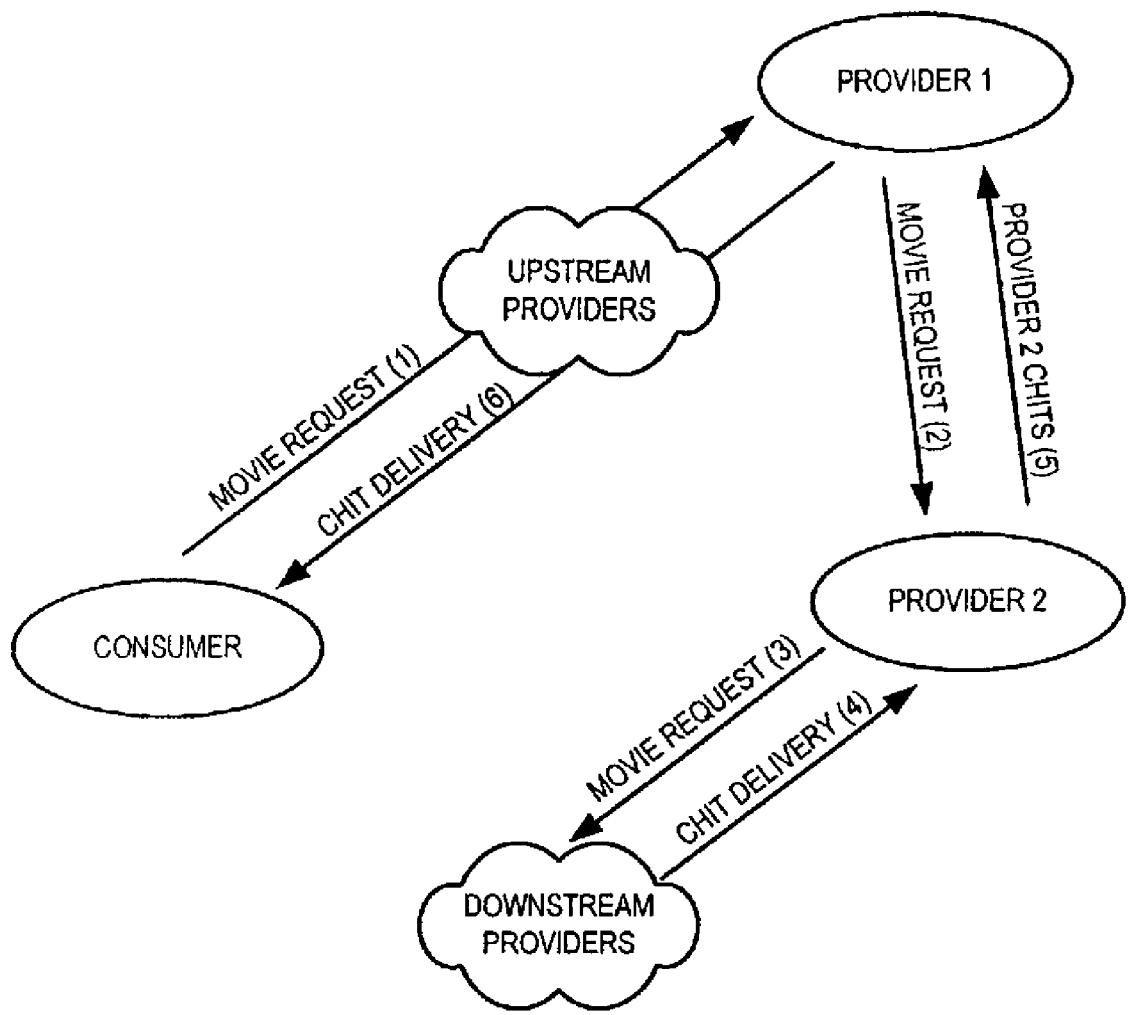
FIG. 11 is an exemplary illustration of a content request.
Figure 12:
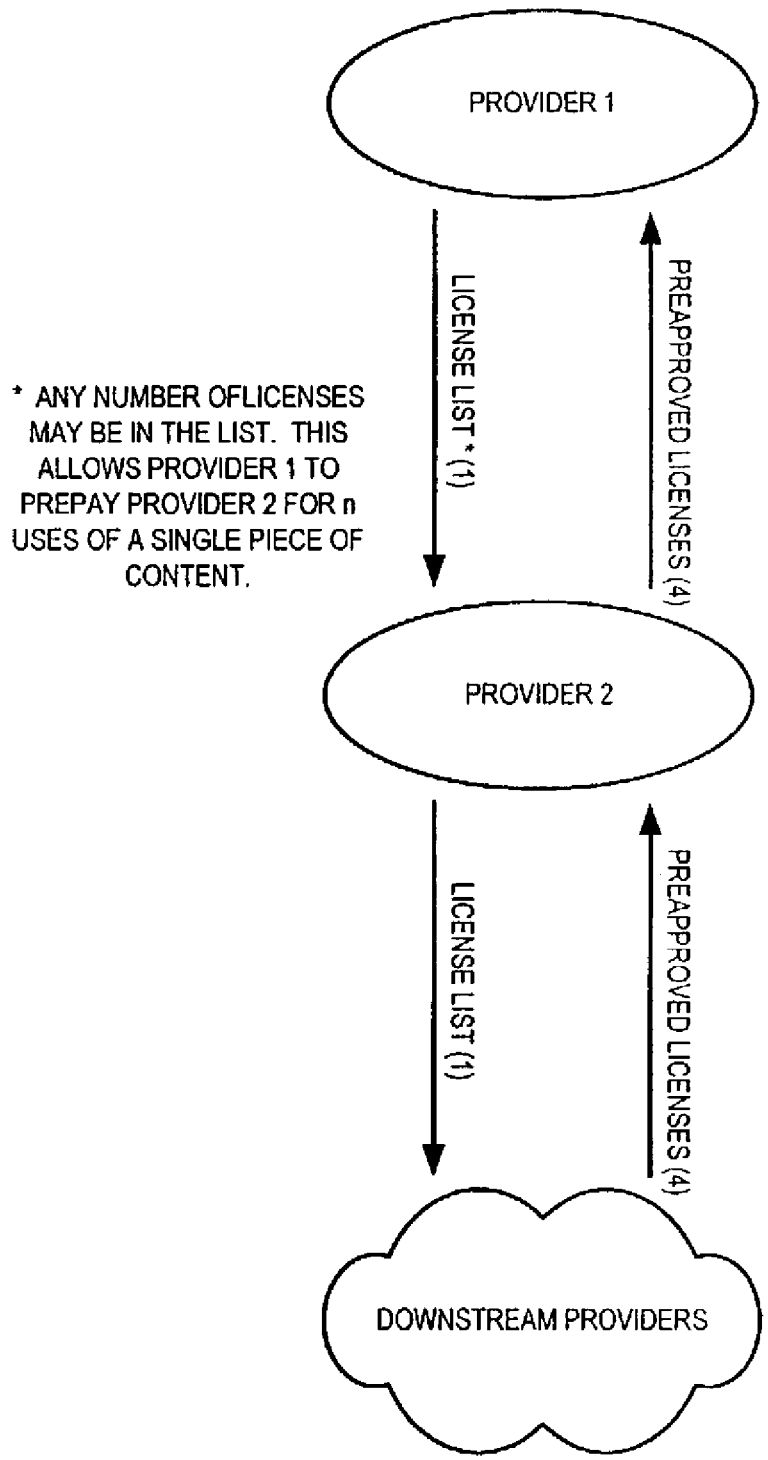
FIG. 12 is an exemplary illustration of a content request showing an approval phase.
Figure 13:
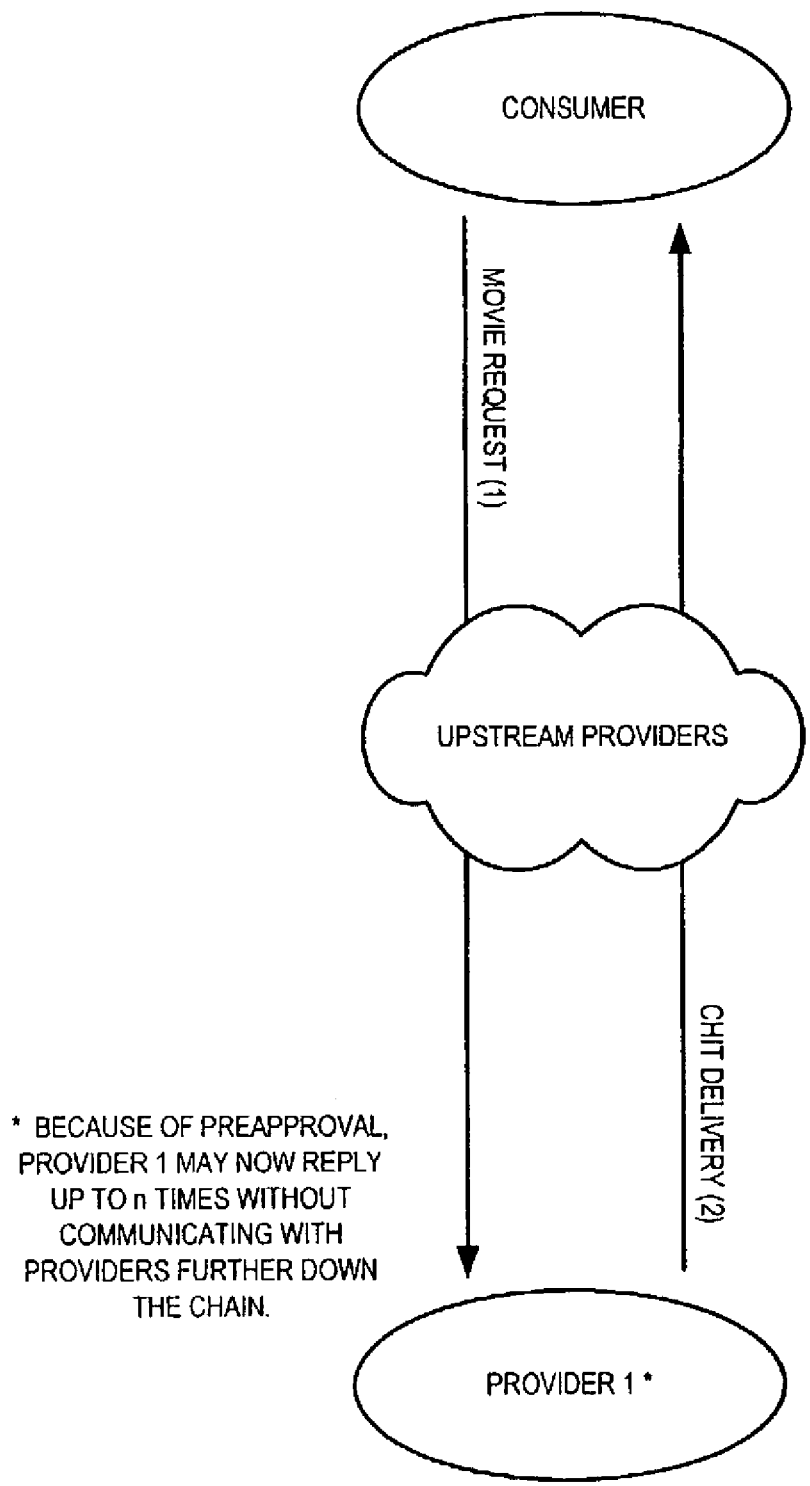
FIG. 13 is an exemplary illustration of a content request showing a delivery phase.

FIGS. 11–13 illustrate ways in which service and content providers can share content, if desired. One way of sharing content is for each content provider to hold the rights to certain content to create a license upon receiving a request for the desired content (FIG. 11). Alternatively, content providers may distribute a predetermined number of licenses to downstream providers so that they do not have to respond to each request on an individual basis and so that downstream providers can be assured of having the ability to distribute a certain number of copies of certain content, without having to obtain approval, which could possibly be denied, by the act of refusing to supply a license, for each individual request that the downstream provider receives from end consumers (FIGS. 12 and 13).

As should be apparent, the system 20 and the protocol used to implement it can be used in a variety of applications beyond the secure distribution of content. Many different types of communications ranging from e-mail, video and multi-media conferencing, data and telemetry collection, and others may benefit from using all or part of the system 20 to enhance security and trust. Some of these additional applications are now discussed.

Confirmation of Geographic Location

As is known, innumerous human activities depend on the human participants trusting the other participants. Furthermore, participants must feel comfortable that the other participants are authentic (i.e., not imposters or frauds) and will not renege on promises or commitments made. In times when most activities took place face-to-face many concerns about authenticity were reduced. For example, before the existence of the telephone and Internet, imposters would have to physically meet and fool any person that the imposter intended to dupe. With modern communications, it is often impossible for parties to know who they are actually communicating with or where the parties are located.

Various biometric and other devices exist that can be used to address concerns of authenticity and trust and many of these can be used with or added into embodiments of the system 20 described. However, the system 20 also has inherent features that lessen concerns of authenticity. One of these is the ability to trace, at least to a relatively specific point, the location of customers ordering content.

As noted, mutating IDs are implemented in embodiments of the invention and the consumer 26 is assigned the first mutating ID 100. Subsequent mutating IDs are assigned each time the consumer desires to obtain content. Further, each customer 26 has a decoding processor or similar device (e.g., a set top box, home computer, etc.) and the customer's address and name are associated with that hardware. Each service provider and content provider also has an actual physical location and address. Because embodiments of the system 20 rely on unraveling multi-encrypted and encapsulated identifiers, the location of a consumer can, at a minimum, be traced to the service area of the service provider of the consumer.

For example, if the customer or a thief moved the customer's hardware to a location outside of the service area of the service provider 24 and requested content, the unraveling of the multi-encrypted and encapsulated identifiers would fail, as the new service provider would be unable to send appropriate keys needed for decoding based on the mutating ID stored in the hardware.

Real Time Authentication of User and Real Time Play Back of Content

As noted, one difficulty with modern communications systems is ensuring the authenticity of the communicating parties. In one embodiment of the invention, the system 20 may be used to encode information such as email messages sent from one party to another. The sending party acts like the content provider/service provider and the receiving party like the customer.

One way to provide extra insurance of authenticity is to send a receiving party certain random information and require that the recipient process that information and relay it back to the sender before communication of valuable information begins. For example, randomly selected sections of text from the U.S. Constitution, the Gettysburg Address, or for that matter any text from the thousands of manuscripts from the Library of Congress may be sent to the receiving party. Before any valuable content or information is sent to the receiving party, the randomly selected text must be properly decrypted and then a duplicate of the information sent back to the recipient. If the receiving party is unable to do this, then an improper communication connection has been made or the receiving party is an imposter, who may, for example, have intercepted or hacked into the communication link of the true recipient. However, without possessing the proper mutating ID, no decryption of the random text is possible.

An additional security feature that may be added to the system 20 is real-time play back of content. As noted earlier, one of the problems for copyright and other legal rights holders, is that digital content can be copied (at least theoretically) an infinite number of times and the time needed to make each copy is very short. For example, a CD containing seventy minutes of music can be completely copied in a few minutes. Compressed files may be copied even faster. This makes large-scale illicit copying of content very attractive to a potential criminal. Once a single copy of valuable content is obtained, hundreds and possibly thousands of pristine copies can be made quickly and then sold.

In embodiments of the system 20, decoding of the content at the consumer 26 or receiver is done in a real-time fashion, meaning that play back in the system 20 occurs no faster than playback of the content as intended for the final viewer or consumer. Thus, if a movie has a running time of 2 hours and twenty minutes, recording of the content sent to the consumer takes the same amount of time, thereby discouraging large scale copying of the same. It should also be noted that the system is configured to restrict the number of decryptions that occur. Generally, only one decryption can be made by the customer. This helps reduce unauthorized copying. It should also be noted that the content may include known copy protection devices or code before it is encrypted. These devices maybe used to prevent or reduce unauthorized copying as well.

Data and Telemetry Collection

As noted, embodiments of the invention may be implemented where just three parties participate. The parties include an authenticator, a sending party (by analogy encompassing the roles and functions of the content provider and service provider), and receiving party (by analogy encompassing the roles and functions of the consumer). As noted, the system 20 may be configured to implement a secure email system. As should be apparent, the system 20 could also be implemented in a variety of other applications where secure communication could be useful, such as collecting data from electric and gas meters, equipment and human monitoring systems, and other data and telemetry collection applications. In general, many existing systems could be readily modified with existing processing and communications hardware to allow communications using the multi-encrypted and encapsulated identifier architecture described herein.

As can be seen from the above, the present invention provides a system and method of distributing content and information with features to protect security and the legal rights of content owners. Additional features and advantages of the are set forth in the attached claims. And, additional embodiments of the invention could be implemented as would be apparent to those of ordinary skill in the art by considering the discussion herein and information provided in the drawings.

What is claimed is:

1. A method of distributing content requested by a first party, the method comprising:

generating, with a processor, a first mutating identifier associated with the content;

repeatedly mutating a previously generated mutating identifier at at least one subsequent party, starting with the first mutating identifier;

terminating mutating a previously generated mutating identifier when the previously generated mutating identifier is authenticated;

encrypting the content based on the previously authenticated mutating identifier;

distributing the encrypted content to the first party; and distributing a decryption key to the first party.

2. The method of claim 1, wherein the encrypted content is distributed to the first party by a second party, and the decryption key is distributed to the first party by a third party.

3. The method of claim 1, further comprising providing each of the parties with a license.

4. The method of claim 3, further comprising tagging the previously generated mutating identifier with a party license.

5. The method of claim 1, wherein mutating a previously generated mutating identifier further comprises:

tagging the previously mutating identifier with a party license; and encrypting the previously tagged mutating identifier.

6. The method of claim 1, wherein the act of terminating mutating the previously generated mutating identifier when the previously generated mutating identifier is authenticated further comprises:

decrypting the previously generated mutating identifier; and validating the decrypted mutating identifier.

7. The method of claim 1, further comprising tracking a use of the content by a second party.

8. The method of claim 1, further comprising discarding the previously generated mutating identifier.

9. The method of claim 8, further comprising modifying the first mutating identifier associated with the content after the content has been requested.

10. The method of claim 1, further comprising generating a new first mutating identifier associated with the content after the content has been requested.

11. A content distribution system comprising:

an authenticator, the authenticator is configured to randomly generates a content provider license, a service provider license, and a consumer device license;

a content provider device, the content provider device having content and a content identifier, and generating a first mutating identifier associated with the content identifier;

a consumer device, the consumer device operable to generate a request for the content; and a service provider device, the service provider device configured to receive the request from the consumer device, receive the first mutating identifier from the content provider device, generate a second mutating identifier associated with the first mutating identifier, and distribute the second mutating identifier to the consumer device, the consumer device generating a third mutating identifier associated with the second mutating identifier, and distributing the third mutating identifier to the authenticator, the authenticator obtaining a validation of the request, the authenticator thereafter informing the service provider of the validation of the request, the content provider thereafter encrypting the content and sending the encrypted content to the consumer device while the authenticator sends a decryption code to the consumer.

12. The system of claim 11, wherein the first mutating identifier is modified after the content has been requested.

13. The system of claim 11, wherein the second mutating identifier is associated with the service provider license.

14. The system of claim 11, wherein the third mutating identifier is associated with the consumer device license.

15. A content distribution system comprising:
an authenticator;
a content provider device, the content provider device having content and a content identifier, and generating a first mutating identifier associated with the content identifier;
a consumer device, the consumer device operable to generate a request for the content; and
a service provider device, the service provider device configured to receive the request from the consumer device, receive the first mutating identifier from the content provider device, generate a second mutating identifier associated with the first mutating identifier, and distribute the second mutating identifier to the consumer device, the consumer device generating a third mutating identifier associated with the second mutating identifier, and distributing the third mutating identifier to the authenticator, the authenticator obtaining a validation of the request, which comprises decrypting the third mutating identifier, the authenticator thereafter informing the service provider of the validation of the request, the content provider thereafter encrypting the content and sending the encrypted content to the consumer device while the authenticator sends a decryption code to the consumer.

16. A content distribution system comprising:
an authenticator, wherein the authenticator tracks the use of the content;
a content provider device, the content provider device having content and a content identifier, and generating a first mutating identifier associated with the content identifier;
a consumer device, the consumer device operable to generate a request for the content; and
a service provider device, the service provider device configured to receive the request from the consumer device, receive the first mutating identifier from the content provider device, generate a second mutating identifier associated with the first mutating identifier, and distribute the second mutating identifier to the consumer device, the consumer device generating a third mutating identifier associated with the second mutating identifier, and distributing the third mutating identifier to the authenticator, the authenticator obtaining a validation of the request, the authenticator thereafter informing the service provider of the validation of the request, the content provider thereafter encrypting the content and sending the encrypted content to the consumer device while the authenticator sends a decryption code to the consumer.

17. A content distribution system comprising:
an authenticator;
a content provider device, the content provider device having content and a content identifier, and generating a first mutating identifier associated with the content identifier;
a consumer device, the consumer device operable to generate a request for the content; and
a service provider device, the service provider device configured to receive the request from the consumer device, receive the first mutating identifier from the content provider device, generate a second mutating identifier associated with the first mutating identifier, and distribute the second mutating identifier to the consumer device, the consumer device generating a third mutating identifier associated with the second mutating identifier, and distributing the third mutating identifier to the authenticator, the authenticator obtaining a validation of the request, the authenticator thereafter informing the service provider of the validation of the request, the content provider thereafter encrypting the content and sending the encrypted content to the consumer device while the authenticator sends a decryption code to the consumer, and wherein the plurality of the mutating identifiers are discarded.

18. A content distribution system comprising:
an authenticator;
a content provider device, the content provider device having content and a content identifier, and generating a new first mutating identifier associated with the content and content identifier after the content has been requested;
a consumer device, the consumer device operable to generate a request for the content; and
a service provider device, the service provider device configured to receive the request from the consumer device, receive the first mutating identifier from the content provider device, generate a second mutating identifier associated with the first mutating identifier, and distribute the second mutating identifier to the consumer device, the consumer device generating a third mutating identifier associated with the second mutating identifier, and distributing the third mutating identifier to the authenticator, the authenticator obtaining a validation of the request, the authenticator thereafter informing the service provider of the validation of the request, the content provider thereafter encrypting the content and sending the encrypted content to the consumer device while the authenticator sends a decryption code to the consumer.

19. A method of content distribution, the method comprising:
making a request with a consumer device for content;
associating a first mutating identifier with the content at a content provider;
distributing the first mutating identifier from the content provider to a service provider over a network;
generating a second mutating identifier with the first mutating identifier at the service provider;
distributing the second mutating identifier from a service provider to the consumer device, over a network;
generating a third mutating identifier with the second mutating identifier at the consumer device;
distributing the third mutating identifier from a service provider to an authenticator;
determining the request from the third mutating identifier;
generating encrypted content based on the request at the content provider;
distributing the encrypted content to the consumer device; and
distributing a key from the authenticator to the consumer device.

20. The method of claim 19, further comprising providing each identifier with a license.

21. The method of claim 20, further comprising tagging the identifier with the license.

22. The method of claim 19, wherein mutating an identifier further comprises:

tagging the identifier with a license; and
encrypting the tagged identifier.

23. The method of claim 19, wherein determining the request from the third mutating identifier further comprises:
    decrypting the third mutating identifier; and
    validating the decrypted mutating identifier.

24. The method of claim 19, further comprising tracking a use of the content.

25. The method of claim 19, further comprising discarding the plurality of the mutating identifiers.

26. The method of claim 25, further comprising generating a new first mutating identifier associated with the content after the content has been requested.

* * * * *

UNITED STATES PATENT AND TRADEMARK OFFICE
CERTIFICATE OF CORRECTION

PATENT NO. : 6,996,544 B2
DATED : February 7, 2006
INVENTOR(S) : Sellars et al.

It is certified that error appears in the above-identified patent and that said Letters Patent is hereby corrected as shown below:

<u>Column 13,</u>
Line 32, delete "maybe" and insert -- may be --.

<u>Column 14,</u>
Line 44, delete "generates" and insert -- generate --.

Signed and Sealed this

Twenty-fifth Day of April, 2006

JON W. DUDAS
*Director of the United States Patent and Trademark Office*